(No Model.)
N. TESLA.
ELECTRIC MOTOR.
No. 416,194. Patented Dec. 3, 1889.
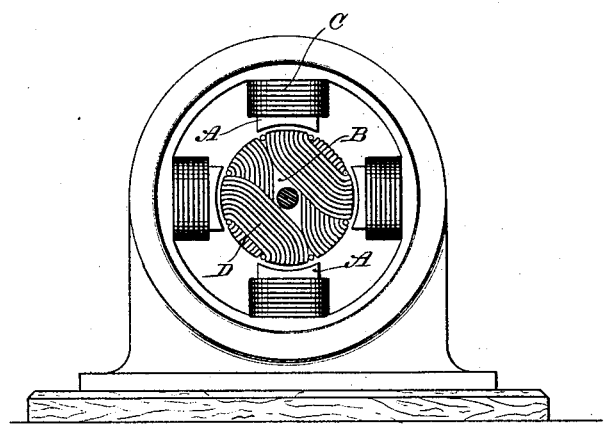
Witnesses:
Raphaël Netter
Robt. F. Gaylord
Inventor
Nikola Tesla
By
Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRIC MOTOR.

SPECIFICATION forming part of Letters Patent No. 416,194, dated December 3, 1889.

Application filed May 20, 1889. Serial No. 311,418. (No model.)

*To all whom it may concern:*

Be it known that I, NIKOLA TESLA, a subject of the Emperor of Austria, from Smiljan, Lika, border country of Austria-Hungary, residing at New York, in the county and State of New York, have invented certain new and useful Improvements in Electro-Magnetic Motors, of which the following is a specification.

This invention relates to the alternating-current electro-magnetic motors invented by me, in which a progressive shifting or rotation of the poles or points of maximum magnetic effect is produced by the action of the alternating currents. These motors I have constructed in a great variety of ways. As instances, I have built motors with two or more energizing-circuits, which I connected up with corresponding circuits of a generator so that the motor will be energized by alternating currents differing primarily in phase. I have also built motors with independent energizing-circuits of different electrical character or self-induction, through which I have passed an alternating current the phases of which were artificially distorted by the greater retarding effect of one circuit over another. I have also constructed other forms of motor operating by magnetic or electric lag, which it is not necessary to describe herein in detail, although my present invention is applicable thereto. In such motors I use an armature wound with a coil or coils, which is sometimes connected with the external circuit and sometimes closed upon itself, and to both forms the present invention applies. In these motors the total energy supplied to effect their operation is equal to the sum of the energies expended in the armature and the field. The power developed, however, is proportionate to the product of these quantities. This product will be greatest when these quantities are equal; hence in constructing a motor I determine the mass of the armature and field cores and the windings of both and adapt the two so as to equalize as nearly as possible the magnetic quantities of both. In motors which have closed armature-coils this is only approximately possible, as the energy manifested in the armature is the result of inductive action from the other element; but in motors in which the coils of both armature and field are connected with the external circuit the result can be much more perfectly obtained.

In further explanation of my object let it be assumed that the energy as represented in the magnetism in the field of a given motor is ninety and that of the armature ten. The sum of these quantities, which represents the total energy expended in driving the motor, is one hundred; but, assuming that the motor be so constructed that the energy in the field is represented by fifty and that in the armature by fifty, the sum is still one hundred; but while in the first instance the product is nine hundred, in the second it is two thousand five hundred, and as the energy developed is in proportion to these products it is clear that those motors are the most efficient—other things being equal—in which the magnetic energies developed in the armature and field are equal. These results I obtain by using the same amount of copper or ampère turns in both elements when the cores of both are equal, or approximately so, and the same current energizes both; or in cases where the currents in one element are induced to those of the other I use in the induced coils an excess of copper over that in the primary element or conductor.

While I know of no way of illustrating this invention by a drawing such as will meet the formal requirements of an application for patent, I have appended for convenience a conventional figure of a motor such as I employ. I would state, however, that I believe that with the problem before him which I have herein stated, and the solution which I have proposed, any one skilled in the art will be able to carry out and apply this invention without difficulty.

Generally speaking, if the mass of the cores of armature and field be equal, the amount of copper or ampère turns of the energizing-coils on both should also be equal; but these conditions will be modified in well-understood ways in different forms of machine. It will be understood that these results are most advantageous when existing under the conditions presented when the motor is running with its normal load, and in carrying out the invention this fact should be taken into consideration.

Referring to the drawing, A is the field-magnet, B the armature, C the field-coils, and D the armature-coils, of the motor.

The motors described in this application, except as to the features specifically pointed out in the claims, are described and claimed in prior patents granted to and applications filed by me, and are not herein claimed.

What I claim is—

1. An electro-magnetic motor having field and armature magnets of equal strength or magnetic quantity when energized by a given current, as set forth.

2. In an alternating-current motor, the combination, with field and armature cores of equal mass, of energizing-coils containing equal amounts of copper, as herein set forth.

NIKOLA TESLA.

Witnesses:
 ROBT. F. GAYLORD,
 FRANK E. HARTLEY.